United States Patent Office
2,976,237
Patented Mar. 21, 1961

2,976,237
LUBRICATING GREASES THICKENED WITH REACTION PRODUCTS OF ARYLAMINE DYES WITH PHOSPHOMOLYBDIC, PHOSPHOTUNGSTIC AND PHOSPHOTUNGSTOMOLYBDIC ACIDS IN ADMIXTURE WITH ULTRAMARINE BLUE

Norman R. Odell, Fishkill, and Joseph Francis Lyons, Wappingers Falls, N.Y., assignors to Texaco Inc., a corporation of Delaware No Drawing. Filed Aug. 13, 1957, Ser. No. 677,822

6 Claims. (Cl. 252—28)

This invention relates to lubricating greases thickened with finely divided solids of two different types which are employed in combination. More particularly, it relates to lubricating greases thickened with reaction products of arylamine compounds with phosphomolybdic, phosphotungstic and phosphotungstomolybdic acids and with ultramarine blue.

High melting solids obtained by reacting aromatic compounds of the class containing a p-aminoarylchromophore group attached to a central carbon atom of the molecule with heteropoly acids of the class consisting of phosphomolybdic, phosphotungstic and phosphotungstomolybdic acids, which are known as PMA, PTA and PTMA pigments, are described as grease thickening agents in our copending application, Serial No. 677,821. As disclosed therein, materials of this class form lubricating greases of very outstanding properties, including particularly very high extreme pressure properties as well as excellent oxidation resistance, water stability and other advantages. However, these materials have the disadvantage of being very expensive, and their use as grease thickening agents is, therefore, limited by practical considerations in spite of their very outstanding properties for this purpose.

We have found that organic pigments of the above class may be employed in combination with the relatively inexpensive ultramarine blue to produce greases having substantially the same advantages as greases thickened with the organic pigments alone, and at very substantially reduced cost. Ultramarine blue is described as a thickening agent for greases in our copending application Serial No. 677,823, now U.S. Patent No. 2,892,776. As disclosed therein, this material forms greases of improved extreme pressure properties as compared with greases thickened with inorganic solids of similar type which have been employed heretofore as grease thickening agents, although inferior in this respect to greases thickened with PMA, PTA and PTMA pigments. The greases of the present invention, thickened with ultramarine blue in combination with PMA, PTA and PTMA pigments have extreme pressure properties of the same order as those obtained with materials of the latter class alone, and in addition they avoid the water sensitivity of the ultramarine blue thickened greases, which is a characteristic of greases prepared from solid thickening agents of the silica or clay type.

The PMA, PTA and PTMA pigments which are employed as grease thickening agents in accordance with this invention may be any reaction products of the class disclosed in the said copending application Serial No. 677,821. This class consists of reaction products with phosphomolybdic, phosphotungstic and phosphotungstomolybdic acids of aromatic compounds containing the characteristic group

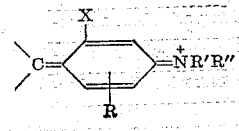

wherein R is hydrogen or a lower aliphatic hydrocarbon substituent group such as a $C_{1-4}$ alkyl group, X may be hydrogen or a substituent group such as R or a divalent substituent group such as oxygen, sulfur, =NH, =NR, etc., forming a fused ring including C with a different aryl group in the molecule, and R' and R" may be hydrogen, hydrocarbon groups or substituted hydrocarbon groups, at least one of the groups represented by R' and R" preferably being a hydrocarbon or substituted hydrocarbon group. The hydrocarbon groups may be alkyl, aryl, alkaryl or aralkyl groups. Substituents which they may contain, and which may be present elsewhere in the molecule in hydrocarbon groups attached to C include —OH, —OR, —NH$_2$, —NHR, —NR$_2$, —COOH, —COOR, —COOM, —NO$_2$, —SO$_3$H, halogens, etc., where R is a hydrocarbon or substituted hydrocarbon group and M is a metal or the hydrogen equivalent thereof.

The compounds of the above class include chiefly derivatives of p-aminotriphenylmethane, p-aminodiphenylnaphthylmethane, 6-amino-9-phenylxanthene and 2-p-aminophenyl benzothiazole. The preferred compounds are represented by the following structural formulas:

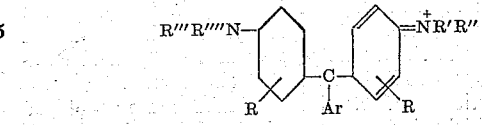

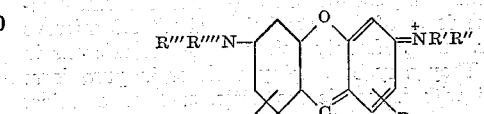

and

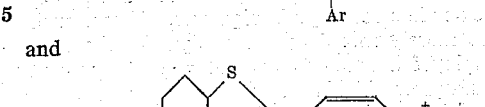

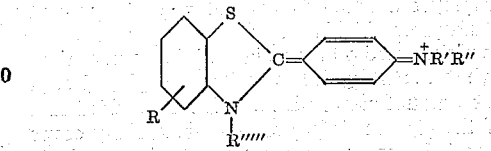

wherein Ar is a phenyl or naphthyl group or a substituted phenyl or naphthyl group, R''' and R'''' are lower alkyl groups, containing from 1 to about 4 carbon atoms, or hydrogen, and R', R", R''' and R'''' are hydrogen or hydrocarbon groups, which may be alkyl, aryl or substituted alkyl or aryl groups, at least one of the groups represented by R' and R" preferably being a hydrocarbon or substituted hydrocarbon group. Substituents may be any of those described above.

Familiar examples of the preferred compounds, which are commercially available, include the following (C.I. referring to the Color Index number): Malachite Green (salt of tetramethyldiaminocarbinol—C.I. 657); Crystal Violet (salt of hexamethyltriaminocarbinol—C.I. 681); Victoria Blue B (salt of tetramethylphenyltriamino-diphenylnaphthylcarbinol—C.I. 729); Patent Blue V (salt of the disulfonic acid of M'-hydroxy-tetraethyldiaminotriphenylcarbinol anhydride—C.I. 712); Setoglaucine (salt of p,p'-tetramethyldiamino-o-chloro-triphenylcarbinol anhydride—C.I. 658); Erioglaucine A (salt of dibenzyldiethyl-diamino-triphenylcarbinol trisulfonic acid anhydride—C.I. 671); Rhodamine 5G (3,6-dimethyldiamino - 2.7 - dimethyl - 9 - o - chlorophenyl - xanthenyl chloride—C.I. 746); Rosamine (tetramethyldiaminophenyl-xanthenyl chloride—C.I. 745); and Thioflavine T salt of p-dimethylaminophenyl-3,6-dimethylbenzo-thiazole—C.I. 815).

The reaction between an aromatic compound of the above class and a heteropoly acid of the class consisting of phosphomolybdic, phosphotungstic and phosphotungstomolybdic acids is carried out by merely mixing the aromatic compound and heteropoly acid together as described, for example, in U.S. 1,232,551, U.S. 1,232,552, U.S. 1,378,882 and U.S. 1,653,851. It is preferably carried out as described by W. W. Williams and J. W. Conley, "Inorganic Pigments," Industrial and Engineering Chemistry, volume 47, No. 8, pages 1507–1510 (August 1955), by adding an aqueous solution containing $P_2O_5$ and $MoO_3$ and/or $WO_3$ in a ratio of about 1:24, respectively, and acidified with hydrochloric acid to a pH of 3–4, to a dilute aqueous solution of the aromatic compound acidified with acetic acid to a pH of 2.3–3.5 and heating to complete the reaction. Where the aromatic compound contains an acid group, such as a sulfo or carboxy group, the reaction is preferably carried out with the addition of a soluble salt of an alkaline earth metal, such as calcium or barium chloride, in the presence or absence of a substrate, such as aluminum hydroxide, blanc fixe, etc., as described, for example, in U.S. 1,378,418.

The reaction product may contain the organic component and the heteropoly acid component in a ratio from about 1:1 to about 1:7, respectively, wherein the heteropoly acid component comprises $P_2O_5$ and $MO_3$ in a ratio from 1:18 to 1:24, where M is molybdenum or tungsten or a mixture of the two. The preferred reaction product, obtained as described by Williams et al., comprises the organic and heteropoly acid components in a ratio of about 1:6, wherein the heteropoly acid component comprises $P_2O_5$ and $MO_3$ in a ratio of about 1:24.

The reaction products described above are employed as grease thickening agents in finely divided form, ordinarily in the form of particles below about 5.0 microns in diameter, and preferably below about 2.0 microns in diameter. They may be employed either in pure form or admixed with inorganic materials, such as alumina, titania, blanc fixe, etc., commonly employed as substrates and extenders for organic pigments. Where such materials are merely mixed with the pigment, they are generally employed in amounts less than about 25 percent by weight, and preferably in amounts less than about 10 percent by weight based on the weight of the composition. However, when the inorganic material is employed as a substrate, the amount present is not critical provided that sufficient of the pigment is present to substantially cover its surface, and the composition may comprise relatively high amounts, such as up to about 90 percent by weight, of such inorganic material.

Ultramarine blue is a double silicate of aluminum and alkali metal containing chemically combined sulfur in amounts from about 1 percent by weight. It preferably comprises about 35 to 50 percent by weight of silica, 20 to 32 percent by weight of alumina, 18 to 23 percent by weight of alkali metal oxide and about 6 to 14 percent by weight of sulfur. This material is employed in finely divided form, suitably in the form of particles below about 5.0 microns in diameter, and preferably below about 3.0 microns in diameter.

The greases of this invention comprise essentially lubricating oils containing a mixture of the organic pigment and ultramarine blue in sufficient amounts to obtain a grease consistency, ordinarily from about 5 to about 50 percent by weight, and preferably about 15 to 45 percent by weight of the grease composition. The mixture may comprise the organic pigment and ultramarine blue in a ratio of from about 1:3 to about 3:1 by weight, and preferably in a ratio of about 1:2 to 2:1 by weight.

The lubricating oils employed in these greases may be any suitable oils of lubricating characteristics, such as are ordinarily employed in lubricating greases, including the conventional mineral lubricating oils, synthetic oils obtained by various refinery processes such as cracking and polymerization, and other synthetic oleaginous compounds, such as high molecular weight ethers, esters, silicons, etc. Suitable mineral oils include paraffinic and naphthenic oils having viscosities in the range from about 80 seconds Saybolt Universal at 210° F., and preferably having viscosities in the range from about 100 to about 600 seconds Saybolt Universal at 100° F. Synthetic oils, including particularly dicarboxylic acid esters, such as those disclosed by R. T. Sanderson in U.S. 2,628,974, may be employed very advantageously to produce greases for operation at elevated temperatures in the range from about 300° F. to about 400° F.

Additives of the usual types may be employed in these greases, such as, for example, oxidation inhibitors, corrosion inhibitors, tackiness agents, extreme pressure agents, etc. Oxidation inhibitors of the amine type, such as diphenylamine, naphthylamine, and phenylenediamine are particularly suitable. The inhibitor combination described in U.S. 2,663,691 comprises about 0.1 to about 8 percent, and preferably about 0.5 percent to about 2.0 percent by weight, based on the weight of the grease, of N,N' diphenyl p-phenylenediamine dissolved in about three times its weight of tricresylphosphate may very advantageously be employed. Also, additional thickening agents may be employed such as other finely divided solids of various types and metal soaps of high molecular weight fatty acids such as are conventionally employed in lubricating greases.

Illustrative of the greases of this invention are greases thickened with a mixture in finely divided form of ultramarine blue and a reaction product represented by the formula

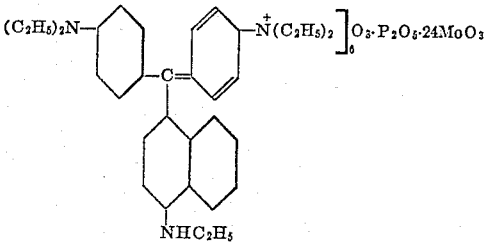

The above reaction product is obtained by precipitating Victoria Pure Blue BO (salt of pentaethyltriaminonaphthyl carbinol) with phosphomolybdic acid under the reaction conditions described by Williams et al. It is employed suitably in the form of particles about 0.5–1 micron in diameter and having a measured surface area of 60 square meters per gram.

The ultramarine blue is suitably a commercial product having a chemical composition corresponding to the formula $Na_3Al_3Si_{3-4}S_2O_{13}$, and a particle size up to about 3.0 microns in diameter, the major portion of the particles being in about the 0.1–0.5 micron range.

The following table shows the extreme pressure and water resistance properties of greases containing the thickening agents described above in combination in comparison with those obtained by employing the same thickening agents separately. All of the greases shown in the table were prepared by mixing together the solid thickening agents with a refined naphthene base distillate oil having a viscosity of about 310 seconds Saybolt Universal at 100° F. in the indicated proportions and milling with two passes through a Premier Colloid Mill at 0.002 inch clearance.

Table 1

| Thickening Agent | Dynamic Water Resistance Test, Percent Loss | Mean Hertz Load, Kg. |
| --- | --- | --- |
| 25% of organic pigment | 2.5 | 79 |
| 30% of ultramarine blue | 97.5 | 36 |
| 30% of 1:2 mixture of ultramarine blue and organic pigment | 2.5 | 78 |
| 30% of 1:1 mixture of ultramarine blue and organic pigment | 0.0 | 48 |
| 30% of 2:1 mixture of ultramarine blue and organic pigment | 7.5 | 54 |

The dynamic water resistance test measures the resistance of the grease against being washed out of a ball bearing in the presence of water. It is carried out as described in U.S. 2,528,373, column 13, lines 25–43.

The mean Hertz load test is a well-known laboratory test for determining the extreme pressure properties of lubricants. It is carried out as described, for example, in U.S. 2,600,056, column 12, lines 13–60, employing a test machine which comprises four steel balls in pyramid arrangement and lubricated at their points of contact with the lubricant under test. The upper ball is rotated at a high speed in contact with the lower three balls while a load is applied to the system by means of a lever arm. The mean Hertz load is the load upon the lever arm which causes welding of the balls after ten seconds of operation.

As shown by the above table, the grease thickened with a 1:2 mixture of ultramarine blue and the organic pigment were equivalent to the grease thickened with the organic pigment alone in both extreme pressure properties as shown by the mean Hertz load test and in water resistance. Increasing the amount of ultramarine blue to a 1:1 ratio resulted in a falling off of the extreme pressure properties but no deterioration in water resistance properties. A further increase in the amount of ultramarine blue up to ratios above 3:1 brought no further decrease in extreme pressure properties but decreased the water resistance of the grease. However, both the extreme pressure properties and water resistance were still satisfactory at ultramarine blue:organic pigment ratios of 2:1.

In addition to the combination of exceptional extreme pressure properties and water resistance shown above, these greases possessed very desirable lubricating properties generally, including high dropping points, good shear resistance and excellent oxidation resistance for uninhibited greases. For example, the grease containing the 1:1 mixture of ultramarine blue and organic pigment had an A.S.T.M. penetration at 77° F. unworked of 350, worked (60 strokes) of 377, an A.S.T.M. dropping point of 424° F. and gave a pressure drop of only 3 pounds after 100 hours at 210° F. in the A.S.T.M. bomb oxidation test. All of these test results compared very favorably with those obtained upon greases thickened with organic pigments of the class disclosed as the sole thickening agent.

Obviously, many modifications and variations of the invention, as hereinbefore set forth, may be made without departing from the spirit and scope thereof and therefore only such limitations should be imposed as are indicated in the appended claims.

We claim:
1. A lubricating grease consisting essentially of a lubricating oil thickened to a grease consistency by a mixture in about a 1:3 to 3:1 ratio by weight of ultramarine blue in the form of particles below about 3 microns in diameter and a high melting organic compound selected from the class of compounds represented by the following formulas:

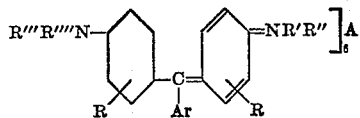

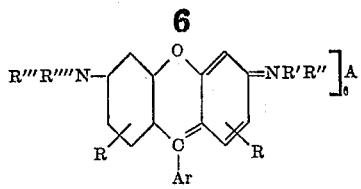

and

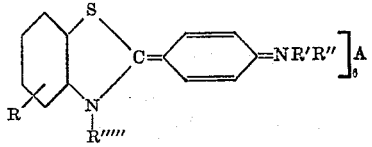

wherein Ar is chosen from the group consisting of phenyl, naphthyl and substituted phenyl and naphthyl groups, R and R''''' are chosen from the group consisting of hydrogen and lower alkyl groups, R', R'', R''' and R'''' are chosen from the group consisting of hydrogen, hydrocarbon groups and substituted hydrocarbon groups, at least one group represented by R' and R'' being chosen from the group consisting of hydrocarbon and substituted hydrocarbon groups, and A is the anion of a heteropoly acid chosen from the group consisting of phosphomolybdic, phosphotungstic and phosphotungstomolybdic acids, said organic compound being in the form of particles below about 5 microns in diameter.

2. A lubricating grease composition according to claim 1 wherein the said organic compound is in the form of particles below about 2 microns in diameter.

3. A lubricating grease composition according to claim 1 wherein the said organic compound is the salt of pentaethyltriaminodiphenylnaphthylcarbinol.

4. A lubricating grease composition according to claim 1 wherein the said lubricating oil is a mineral oil.

5. A lubricating grease composition according to claim 1 wherein the said ultramarine blue and said high melting organic compound are present in a ratio of about 1:2 to 2:1 by weight.

6. A lubricating grease composition according to claim 1 wherein the ultramarine blue consists essentially of about 35–50 percent by weight of silica, about 20–32 percent by weight of alumina, about 18–23 percent by weight of an alkali metal oxide and about 6–14 percent by weight of sulfur.

References Cited in the file of this patent

UNITED STATES PATENTS

| | | |
|---|---|---|
| 1,458,542 | Plauson | June 12, 1923 |
| 2,020,539 | Dourif | Nov. 12, 1935 |
| 2,099,689 | Holzach et al. | Nov. 23, 1937 |
| 2,140,248 | Retter et al. | Dec. 13, 1938 |
| 2,597,018 | Merker et al. | May 20, 1952 |
| 2,648,633 | Peterson et al. | Aug. 11, 1953 |

OTHER REFERENCES

Transactions, Faraday Soc., London, vol. 36, pp. 1007–17 (1940), article by Mardles.